INVENTOR.
BERT NOBLE
BY A.B.Bowman
ATTORNEY

Sept. 5, 1933.  B. NOBLE  1,925,541
CONDUCTING HOPPER FOR CONCRETE AGGREGATE
Filed April 9, 1930  2 Sheets-Sheet 2
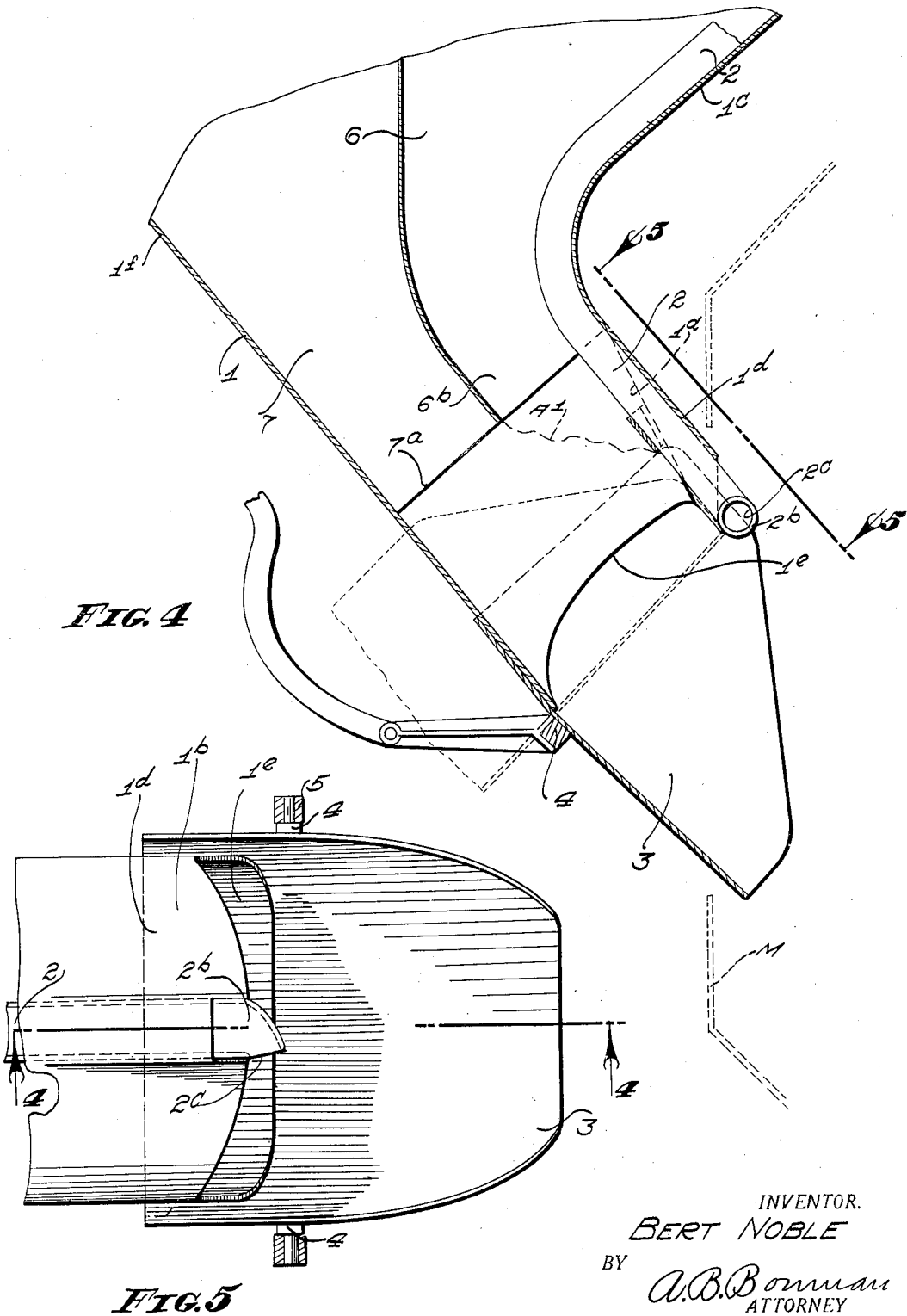
INVENTOR.
BERT NOBLE
BY
A. B. Bowman
ATTORNEY Patented Sept. 5, 1933

1,925,541

UNITED STATES PATENT OFFICE 1,925,541

CONDUCTING HOPPER FOR CONCRETE AGGREGATE

Bert Noble, San Diego, Calif., assignor to Roads Construction Company, Ltd., Los Angeles, Calif., a corporation of California Application April 9, 1930. Serial No. 442,746

5 Claims. (Cl. 83—44)

My invention relates to conducting hoppers for concrete aggregate, and the objects of my invention are:

First, to provide a hopper of this class which is especially adapted for use as a weighing hopper in connection with a concrete mixing plant, though applicable wherever it is desired to weigh or discharge a plurality of substances into a common receiver;

Second, to provide a hopper of this class which may be readily substituted in place of a conventional weighing hopper with minimum alterations;

Third, to provide a hopper of this class which may be used merely as an intermediate or conducting hopper where it is not desired to weigh the material;

Fourth, to provide a hopper of this class which supports a plurality of ingredients of a mixture in separated but adjacent columns;

Fifth, to provide a hopper of this class which is partitioned off so as to form a plurality of material receiving spaces which bear relative proportions approximately equal to the relative proportions of the materials to be received thereby;

Sixth, to provide a conducting hopper in which the discharge ends of the various material spaces are so arranged that the various materials discharge at a rate approximately proportional to the relative volumes of materials contained in the hopper, thus for any given period of flow, the proportions of the materials discharged are approximately equal to the volumetric proportions of the materials originally measured into the hopper;

Seventh, to provide a hopper of this class which partly mixes the various materials as they pass out, whereby, when the hopper is used in connection with a concrete mixer or the like, the time and effort required for the operation of the mixer is reduced to a minimum; and Eighth, to provide on the whole a novelly constructed conducting hopper which is particularly simple of construction proportional to its functions, durable, efficient in its action, and which will not readily deteriorate or get out of order.

Figure 1:
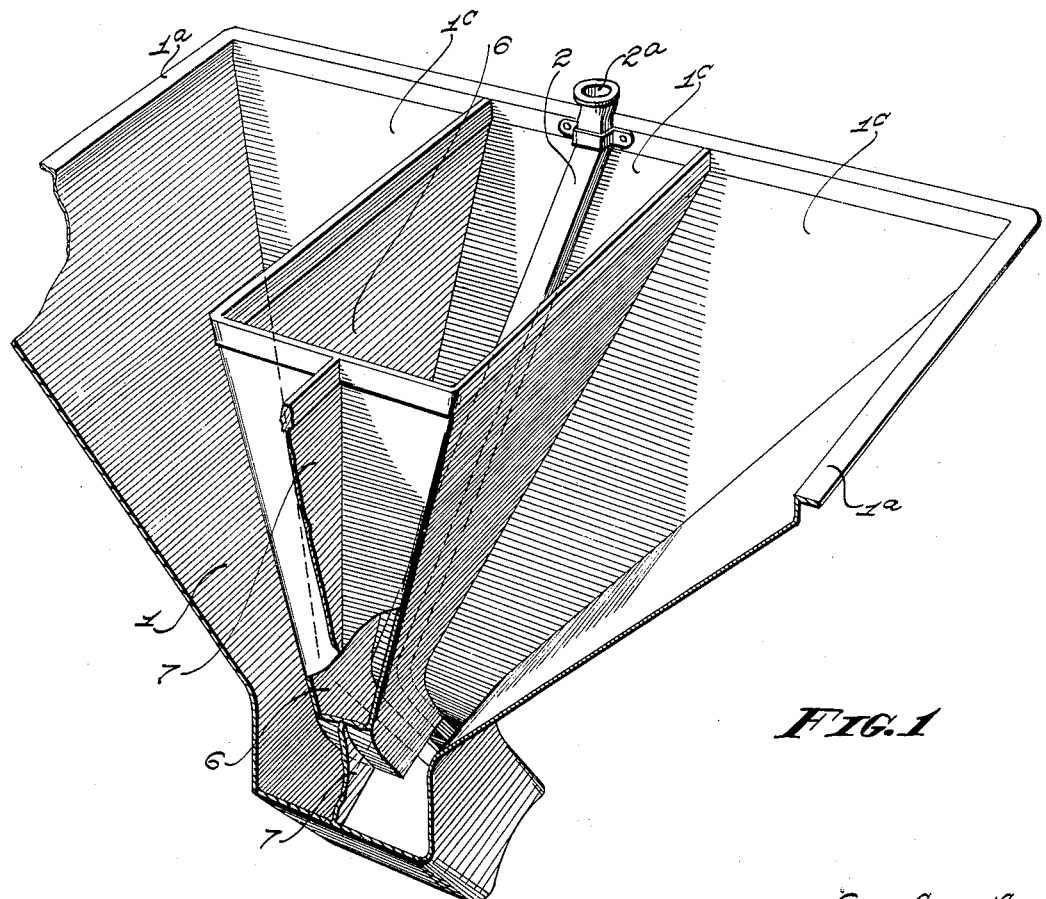
Figure 2:
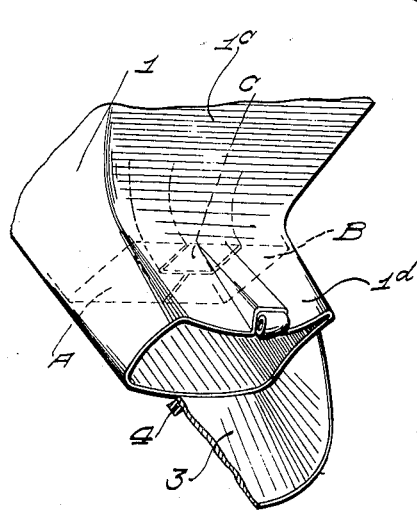
Figure 3:
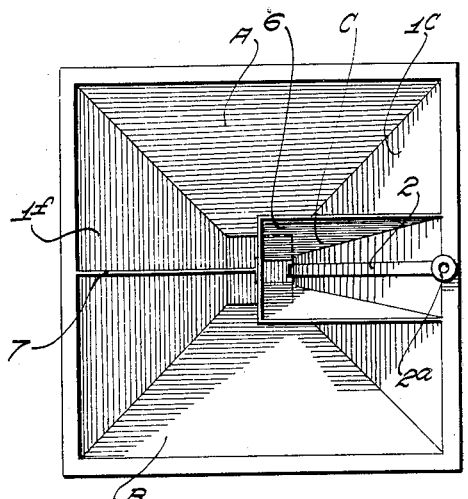

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a fragmentary perspective view of the weighing hopper with the discharge gate removed; Fig. 2 is another fragmentary perspective view of the lower portion thereof, with the discharge gate shown fragmentarily; Fig. 3 is a reduced plan view of the conducting hopper; Fig. 4 is a fragmentary transverse sectional view of the lower end of the hopper taken through 4—4 of Fig. 5; and Fig. 5 is a fragmentary elevational view of the discharge end of the hopper taken from the line 5—5 of Fig. 4.

Similar characters of reference refer to similar parts and portions throughout the several views of the drawings.

Main hopper 1, water pipe 2, gate 3, gate shaft 4, gate operating mechanism 5, and inner hopper 6 constitute the principal parts and portions of my hopper for concrete aggregate.

The hopper 1 is in the form of a four-sided inverted pyramid, having a reenforced upper margin 1a. The lower end of the hopper forms a discharge passage 1b which extends downwardly and to one side of the hopper a short distance and in angular relation to the perpendicular. The side of the hopper towards which the passage 1b extends is the forward side thereof.

Centered relative to the forward side 1c of the hopper is a water pipe 2, the upper end of which extends slightly beyond the reenforced upper margin of the hopper, and is provided with a suitable fitting 2a, which is adapted to be connected to a source of water supply, or with the water weighing or measuring apparatus used in connection with the concrete mixing plant.

The water pipe 2 extends downwardly contiguous to the forward side 1c of the hopper and passes around the curved lower margin of the forward wall 1c. This wall 1c merges into the upper wall 1d of the discharge passages 1b. The upper wall 1d of the passage may be offset upwardly so as to receive the water pipe 2, and enable the under side of the water pipe to clear the upper side of the discharge orifice 1e at the end of the passage 1b.

The discharge end 1e of the passage 1b is adapted to be closed by a gate 3. The gate 3 is hinged on a transversely extending shaft 4 mounted adjacent the lower margin of the discharge opening. The gate is so arranged that, when in the dotted position shown in Fig. 4, it closes the discharge orifice 1e, and when rotated to the position shown by solid lines, forms a trough so as to discharge the contents of the hopper into the mixer M, the receiving end of which is shown by dotted outline in Fig. 4.

The gate is rotated by any suitable mechanism 5, as shown fragmentarily in Fig. 4.

The extended end of the trough is preferably curved so as to conform to the opening in the mixer, and the end of the discharge passage 1b is so shaped as to substantially conform to the curvature of the gate. The gate need only close the discharge end of the hopper sufficiently to prevent the passage of the coarser material used in concrete, such as the rock, as the rock may be poured into the hopper first, and close the end thereof, so that the finer materials, such as sand and cement, are not in contact with the gate.

The discharge end 2b of the water pipe is curved to one side so that the orifice 2c thereof directs the water substantially horizontally and to one side of the opening to the mixer. As shown in Fig. 4, the discharge end 2b of the water pipe projects slightly within the mixer.

Centered relative to the forward side of the hopper 1, is an inner hopper 6. The rear wall 6a of the inner hopper is located approximately midway between the forward and rear walls 1c and 1f, respectively, of the main hopper 1. The forward wall of the main hopper 1 also constitutes the forward wall of the inner hopper 6. The lower end 6b of the inner hopper is curved and extends part way into the discharge passage 1b of the main hopper, but terminates a short distance inward from the discharge end 1e thereof.

Extending from the rear wall 6a of the inner hopper to the rear wall 1f of the main hopper is a partition 7, which divides the remaining portion of the main hopper approximately equally. The lower margin 7a of the partition extends flush with the lower margin 6b of the inner hopper. Thus, within the margins of the main hopper, there are formed three material receptacles A, B, and C. The receptacles A and B are approximately of equal size and receive the sand and gravel, respectively. The receptacle C, being much smaller, receives the cement.

The lower end 6b of the hopper 6 and the lower margin 7a of the partition are positioned inwardly from the discharge end 1e of the hopper 1 a sufficient distance so that when rock is poured in the receptacle portion A, it can flow past the end of the inner hopper and separate the discharge end thereof from the discharge end of the main hopper and form a seal between the end of the hopper 6 and the gate 3. This rock also prevents the waste of sand from the receptacle B.

It is desired, as an ideal condition, to have the constituents of the concrete pour out of the hopper at rate proportional to their relative volumes. As, for example, supposing the hopper 1 contained five parts of rock, four parts of sand, and one part of cement; then suppose the gate 3 is open long enough to discharge one-third of the material. It is desired that the ratio of the constituents which have been discharged should be approximately five parts of rock, four parts of sand, and one part of cement.

This is accomplished, first, by arranging the discharge ends of the receptacles A, B, and C in contiguous relation to each other, and within the end of the hopper 1 so that all three receptacles discharge at once; and second, by making the area of the discharge end of receptacle C, containing the cement, smaller than the others, said cement does not flow as much. Hence, by making the discharge ends the proper size, the desired relative flow of the materials is accomplished. The sand and rock, being of approximately equal volumes, the openings to their receptacles A and B may be approximately equal. Although the proportions of the various constituents vary somewhat, still the relative flow of the various constituents will be within the desired limits of accuracy, for the purpose of this proportional flow is not, primarily, to enable mixing of part of the hopper load, but facilitate the mixing of the constituents.

The discharge end of the cement hopper being above the sand and rock hopper, causes the cement to sift in and mix with the sand and rock, as they flow out of the hopper. Likewise, because of the converging relation of the side walls of the hopper 1, sand and rock coming together in converging streams mix to a considerable extent.

Thus, because of the proportionate rates of flow, the position of the discharge end of the cement receptacle, and the converging of the sand and rock, the mere act of discharging the concrete aggregate, that is, the rock, sand, and cement, partially mixes the aggregate so as to greatly reduce the time required to complete the mixing of the aggregate. This partial mixing aids in another way, in that it takes place while the constituents are in a more or less dry condition before the water from the pipe 2 has come in contact therewith, thus eliminating the need of running the mixer "dry" for a few moments before introducing the water therein.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a hopper for concrete aggregate, a hopper shell, a tubular spout therefor extending angularly from the lower end thereof, an inner cement receiving hopper positioned contiguous to the one side of said hopper shell and extending into said spout contiguous to the upper side thereof, and a partition dividing the remaining portion of said hopper shell into sand and rock hoppers, said gravel and rock receiving hoppers having discharge ends within said spout and below said cement receiving hopper, whereby during flow of material from said spout, cement from said cement hopper is discharged on top of said sand and gravel and caused to sift and intermingle therewith, the discharge orifice of said cement receiving hopper bearing a relation with the discharge orifices of said other hoppers approximately equal to the relation of cement to said other constituents, a combined discharge chute and gate at the lower end of said spout forming a common closure for said hoppers, whereby the contents of said hoppers flow simultaneously from said hopper shell.

2. In a hopper for concrete aggregate, a hopper shell, a tubular spout therefor extending angularly from the lower end thereof, an inner cement receiving hopper positioned contiguous to the one side of said hopper shell and extending into said spout contiguous to the upper side thereof, and a partition dividing the remaining portion of said hopper shell into sand and rock hoppers, said gravel and rock receiving hoppers having discharge ends within said spout and below said cement receiving hopper, whereby during flow of material from said spout, cement from said cement hopper is discharged on top of said sand and gravel and caused to sift and intermingle therewith, the opposed walls of the rock and gravel receiving portions of said hopper shell arranged in converging relation, whereby the sand and gravel therefrom are directed convergingly so as to equal each other, the discharge orifice of said cement receiving hopper bearing a relation with the discharge orifices of said other hoppers approximately equal to the relation of cement to said other constituents, and a combined discharge chute and gate at the lower end of said spout forming a common closure for said hoppers, whereby the contents of said hoppers flow simultaneously from said hopper shell.

3. In a multiple compartment hopper, a shell, a cement hopper mounted within said shell contiguous to one wall thereof and spaced from the opposite wall of said shell, a partition extending from the inner wall of said hopper to said opposite wall of said shell, dividing the portion of said shell surrounding said cement hopper into gravel and rock hoppers, a tubular spout for said shell and common to said hoppers extending downwardly in angular relation to said shell, and a combined gate and discharge chute associated with the discharge end of said shell and arranged when in one position to close the end of said shell, and when in its other position to form a trough or chute continuing from the lower portions of said shell.

4. In a multiple compartment hopper, a shell, a cement hopper mounted within said shell contiguous to one wall thereof and spaced from the opposite wall of said shell, a partition extending from the inner wall of said hopper to said opposite wall of said shell, dividing the portion of said shell surrounding said cement hopper into gravel and rock hoppers, a tubular spout for said shell and common to said hoppers extending downwardly in angular relation to said shell, a water conduit extending down a wall of said shell and along the upper side of said spout, said conduit terminating at a point forwardly of said spout so as to terminate within a mixing drum disposed so as to receive the contents of said hoppers, and an orifice for said conduit arranged to direct water angularly and laterally with respect to said spout.

5. In a multiple compartment hopper, a shell, a cement hopper mounted within said shell contiguous to one wall thereof and spaced from the opposite wall of said shell, a partition extending from the inner wall of said hopper to said opposite wall of said shell, dividing the portion of said shell surrounding said cement hopper into gravel and rock hoppers, a tubular spout for said shell and common to said hoppers extending downwardly in angular relation to said shell, a water conduit extending down a wall of said shell and along the upper side of said spout, said conduit terminating at a point forwardly of said spout so as to terminate within a mixing drum disposed so as to receive the contents of said hoppers, an orifice for said conduit arranged to direct water angularly and laterally with respect to said spout, and a combined gate and discharge chute associated with the discharge end of said shell, and arranged when in one position to close the end of said shell, and when in its other position to form a trough or chute continuing from the lower portions of said shell.

BERT NOBLE.